Patented Aug. 7, 1934

1,969,166

UNITED STATES PATENT OFFICE 1,969,166

PROCESS FOR MAKING COLLOIDAL SOLUTIONS OF METALS AND OF METALLIC COMPOUNDS IN POLYALCOHOLS AND PRODUCT OBTAINED THEREBY

Carl Hermann von Hoessle, Radebeul-Dresden, Germany, assignor to Chemische Fabrik von Heyden, A. G., Radebeul, near Dresden, Germany, a corporation of Germany No Drawing. Application August 30, 1930, Serial No. 479,103. In Germany June 10, 1929

9 Claims. (Cl. 252—6)

This invention relates to a process for making colloidal solutions of metals and of metallic compounds and it particularly relates to a process making such colloidal solutions in poly-alcohols, the object of the invention being to provide colloidal solutions of metals and of metallic compounds which are free of any objectionable effects accompanying their application.

It is another object of the invention to produce colloidal solutions of metals and of metallic compounds which, owing to their great stability, are applicable for medicinal as well as technical purposes.

It is also an object of the invention to produce colloidal solutions of metals and of metallic compounds in substances which are soluble in solvents used in every day life, i. e. water and alcohol, whereby the field of their applications is considerably increased.

I have found that colloidal solutions of these various classes of substances in poly-alcohols may be obtained by causing these substances to be formed within such poly-alcohols in the presence of suitable protective colloids, such as vegetable gums, for instance gum arabic, decomposition and oxidation products of albumen, which dissolve in such poly-alcohols, as for instance glycol, glycerin, and the like, derivatives of such poly-alcohols in which their poly-alcohol character is not disturbed, and emulsions containing such poly-alcohol.

For the better understanding of my new invention I am going to describe how I proceed in its operation, citing glycerin by way of example as a representative of the said poly-alcohols.

Example 1

7 parts of silver nitrate are dissolved in water. I then introduce a solution of the molecular proportion of sodium hydroxide thereby obtaining silver oxide. One part of gum arabic, or of lignin-sulphonate of sodium are dissolved in 100 parts of glycerin. The silver-oxide is thus suspended in the glycerin solution; the same is then heated on the water bath and well agitated while hydrogen is passed through it. By this process the silver oxide is reduced to silver which dissolves forming a glycero-sol which displays in the direct light a light-grey and in the diffused light a brownish-red color. The silver-sol thus produced is of eminent stability.

Example 2

I operate in the same manner as described by Example 1 until the silver is reduced to its elementary state and is dissolved in the glycerin. Then I introduce into the silver glycero-sol the proportionate quantity of finely produced iodine to transform the silver into silver iodide which stays in solution as silver-iodide glycero-sol displaying a grey-brown color.

Example 3

Five parts of copper-sulfate are dissolved and transformed into copper-oxide in any of the well known ways. The freshly precipitated copper oxide is suspended in a solution of 1 part of lignin-sulphonate of sodium in glycerine and hydrogen is passed through the same while being heated. I thus obtain a reddish-brown, very stable cuprous-oxide sol.

Example 4

Ten parts of lead nitrate are transformed into lead oxide in the manner described by the preceding examples and are then suspended in a solution of 1 part of a protective colloid, such as ligninsulphonate of sodium, in glycerin. Upon passing hydrogensulfide gas through the solution, I obtain a colloidal solution of lead sulfide in glycerin.

These colloidal solutions obtained by my new invention, as described by above example, are of considerable importance because they may easily be embodied in salves.

In the operation of my process I am not restricted in respect to polyalcohols to the glycerin cited in the examples, nor to the protective colloids described above, nor to the enumerated substances, which were shown to be transferable into the colloidal state nor to the applied proportions of the same. Zinc oxide, nickel oxide, ferrous oxide, bismuth monoxide, bismuth sulfide, copper sulfide, mercury-sulfide and other medicinally and technically applicable substances may be made amenable to the purposes of my invention.

For instance the iodine of Example 2 may be replaced by a corresponding quantity of the other halogens, i. e. chlorine, or bromine, to form the corresponding colloidal silver chloride, or silver bromide, respectively, which are very important for photographic purposes.

What I claim is:

1. The process of manufacturing a colloidal solution of a metal in a polyalcohol, said process comprising suspending the oxide of the metal in a solution of a protective colloid selected from a group consisting of such substances as gum arabic, decomposition and oxidation products of albumen, salts of lignosulphonic acid, in said polyalcohol, and passing a reducing gas through the mixture.

2. The process of manufacturing a colloidal solution of a metal in a polyalcohol, said process comprising suspending the oxide of the metal in a solution of a protective colloid selected from a group consisting of such substances as gum arabic, decomposition and oxidation products of albumen, salts of lignosulphonic acid, in said polyalcohol, heating the mixture of aforesaid ingredients, and passing hydrogen through the said hot mixture.

3. The process of manufacturing a colloidal solution of a metal in glycerin, said process comprising suspending the oxide of the metal in a solution of a protective colloid selected from a group consisting of such substances as gum arabic, decomposition and oxidation products of albumen, salts of lignosulphonic acid, in glycerin, heating the mixture of aforesaid ingredients, and passing a reducing gas through the said hot mixture.

4. The process of manufacturing a colloidal solution of a metal in glycerin, said process comprising suspending the oxide of the metal in a solution of a protective colloid selected from a group consisting of such substances as gum arabic, decomposition and oxidation products of albumen, salts of lignosulphonic acid, in glycerin, heating the mixture of aforesaid ingredients, and passing hydrogen through the said hot mixture.

5. The process of manufacturing a colloidal solution of a metal in glycerin, said process comprising suspending the oxide of the metal in a solution of a colloid of vegetable origin in glycerin, heating the mixture of aforesaid ingredients, and passing hydrogen through the said hot mixture.

6. The process of manufacturing a colloidal solution of metal in glycerin, said process comprising suspending the oxide of the metal in a solution of gum arabic in glycerin, heating the mixture of aforesaid ingredients, and passing hydrogen through the said hot mixture.

7. The process of manufacturing a colloidal solution of silver in a polyalcohol, said process comprising suspending silver oxide in the solution of a protective colloid selected from a group consisting of such substances as gum arabic, decomposition and oxidation products of albumen, salts of lignosulphonic acid, of a polyalcohol, heating the mixture of aforesaid ingredients, and passing hydrogen through the said hot mixture.

8. The process of manufacturing a colloidal solution of silver in glycerin, said process comprising suspending silver oxide in the solution of gum arabic in glycerin, heating the mixture of aforesaid ingredients, and passing hydrogen through the said hot mixture.

9. As a new article of manufacture, a colloidal solution of metallic silver in glycerin.

CARL HERMANN von HOESSLE.